UNITED STATES PATENT OFFICE

2,277,734

DIELECTRIC MATERIAL AND METHOD OF MAKING THE SAME

Eugene Wainer and Norman R. Thielke, Niagara Falls, N. Y., assignor to The Titanium Alloy Manufacturing Company, New York, N. Y., a corporation of Maine No Drawing. Application July 4, 1939, Serial No. 282,810

8 Claims. (Cl. 106—46)

This invention relates to ceramic dielectric materials and the method of making the same. More particularly it relates to such materials in which titanium dioxide is the predominant constituent.

This application is a continuation in part of our copending application Serial No. 270,462, filed April 27, 1939. In the aforesaid copending application the method of forming and firing such dielectric material was pointed out in detail. In addition, the disadvantages of certain impurities in titanium dioxide when intended to be used as a dielectric were also pointed out. Finally, it was pointed out that there were certain advantages in adding the titanates of the alkaline earth metals, calcium, barium and strontium.

It is an object of this invention to produce a titanium dioxide ceramic of improved characteristics. It is a further object to utilize directly naturally occurring rutiles in the formation of ceramic bodies of excellent dielectric characteristics. It is a further object to provide a method for forming ceramic bodies of excellent dielectric characteristics. Other objects will appear hereinafter.

These objects are accomplished by incorporating in a ceramic dielectric body, containing principally titanium dioxide, one or more of a certain group of titanates. The titanates which are useful in this connection are of the alkaline earth elements (calcium, strontium and barium), cadmium, zinc, boron and divalent lead. The most useful of these are strontium, barium, cadmium, boron and divalent lead.

In our above mentioned copending application the disadvantages of certain impurities in titanium dioxide, when used for dielectric purposes, were pointed out. Among the most harmful of these impurities is vanadium. For example, a rutile ceramic dielectric containing no titanates and prepared as described below showed a resistivity about one thirtieth that of a heavy grade titanium dioxide ceramic dielectric containing no titanates and also prepared as described below. The difference is probably caused in good part by the much larger quantity of vanadium in the rutile body. This is borne out by experiments with bodies containing vanadium titanate. These were prepared exactly as in Examples 3 and 4 below, respectively, except that vanadium titanate (V₂TiO₇) was used in place of strontium titanate and the peak temperatures employed were 2400° F. and 2500° F. respectively. Both bodies showed a resistivity of less than 100 megohms (the upper limit of the measuring instrument used) and extremely high power factors (over 15%). On the other hand, the dielectric constants were quite high, and, in the case of the heavy grade titanium dioxide body, increased quite markedly with increase of temperature. The following table shows these relationships:

TABLE I

Vanadium titanate bodies

| Temperature | H. G. TiO₂ P.F. | H. G. TiKO₂ | Rutile P. F. | Rutile K |
|---|---|---|---|---|
|  | Percent | | Percent | |
| 22° C | 16.3 | 100.8 | | |
| 25° C | | | 20.6 | 103.0 |
| 40° C | 17.3 | 102.0 | 20.8 | 101.9 |
| 50° C | 18.5 | 102.7 | 21.4 | 101.2 |
| 75° C | 23.6 | 107.5 | 22.5 | 92.3 |
| 100° C | 28.1 | 112.0 | 22.1 | 78.5 |
| 110° C | 32.0 | 116.5 | 18.6 | 59.0 |
| 125° C | 36.6 | 121.9 | 19.5 | 55.1 |
| 135° C | 41.0 | 127.3 | 17.4 | 40.4 |
| 150° C | 47.6 | 136.7 | 19.8 | 41.6 |

It has now been found that the harmful effect of these impurities, and particularly vanadium, can be minimized by adding to the ceramic body one or more of the titanates of calcium, barium, strontium, cadmium or divalent lead. At the same time other valuable dielectric properties can be secured by adding to the ceramic body one or more of the above titanates or zinc titanate or boron titanate. In general, the quantity of such titanate is preferably between 3% and 20% of the entire ceramic composition. Amounts below 3% are relatively ineffectual and amounts above 20% have the following disadvantages: production of higher shrinkages; difficulty of maintaining proper purity and uniformity, due to the fluxing action of the titanates; difficulty of preventing warpage; development of gas porosity due to bubbling, and sometimes an adverse effect on the dielectric constant. The particle fineness of the titanates should be comparable to that of the titanium dioxide base.

The particle size of the titanium dioxide base is also of importance in securing the best results. Materials containing particles of a lower maximum size (i. e. finer particles) are more suitable for several reasons: They are much easier to control on firing; the values obtained are more uniform; the temperature range of satisfactory vitrification is broadened; there is less tendency towards crystallization; there is less porosity; and the effect of impurities is minimized. Best results are also secured by firing the ceramic dielectric to a temperature such as to secure maximum vitreous structure with substantially no crystalline growth.

We have also tried certain other titanates, with much less useful results, and in some cases with results that are positively harmful. For example, a body prepared as in Example 2 below, except that magnesium titanate is employed in place of barium titanate and that the peak temperature is 2400° F., shows a resistivity below 800 megohm-centimeters, a dielectric constant of 69.5 and a power factor of 0.61%. Similar bodies containing magnesium titanate plus heavy grade titanium dioxide, or either beryllium titanate, aluminum titanate or cerium titanate (either $CeTiO_4$ or $CeTi_2O_6$), plus heavy grade titanium dioxide or rutile, as in Examples 1, 3 or 4 below, show results which are in every case inferior to bodies containing no titanates. Bodies containing copper titanate are even worse.

Although it is possible to form titanates at firing temperatures by adding compounds other than the titanates, such as the oxides, to titanium dioxide, it is not desired to do so for the reason that the reaction taking place usually involves the evolution of gas. For example, barium oxide exposed to the air will form barium carbonate, which at high temperatures will react to form barium titanate with the evolution of carbon dioxide. The evolution of gas causes a very undesirable bubbling or gas porosity in the ceramic, which cannot be entirely removed even upon prolonged firing. Such porosity renders the ceramic very undesirable for dielectric purposes.

The effect of adding the titanates to titanium dioxide bodies in accordance with the present invention may be visualized more clearly by the tables which are appended to the subsequent examples.

The titanium dioxide utilized in the various examples show the following analyses:

TABLE II

| | Heavy grade $TiO_2$ | Rutile A | Rutile B |
|---|---|---|---|
| $TiO_2$ | 97.8 | 95.3 | 94.3 |
| $SiO_2$ | 1.56 | 1.92 | 3.78 |
| $ZrSiO_4$ | | 1.76 | 1.06 |
| $Fe_2O_3$ | 0.038 | 0.168 | 0.175 |
| $Al_2O_3$ | 0.40 | 0.60 | 0.40 |
| $CaO$ | 0.03 | 0.03 | 0.03 |
| $MgO$ | 0.04 | 0.007 | 0.01 |
| $MnO_2$ | 0.004 | 0.002 | 0.001 |
| $P_2O_5$ | 0.06 | 0.03 | 0.03 |
| $Cr_2O_3$ | | 0.002 | 0.001 |
| $Na_2O$ | | | |
| $BaO$ | | | |
| $CuO$ | 0.001 | 0.001 | 0.001 |
| $B_2O_3$ | 0.001 | 0.001 | 0.001 |
| $V_2O_5$ | 0.001 | 0.15 | 0.20 |

They are prepared as follows:

Heavy grade $TiO_2$

Pigment grade $TiO_2$ of suitable purity is heated, without other preparation, to a temperature of 1350° C., and maintained there for several hours. The resulting material shows well-defined crystals of an average particle size of about 2 microns.

Rutile A

Australian sand deposits containing a suitable quantity of high grade rutile are first freed from quartz, sea shells, calcite, organic dirt, etc. by gravity separation over a wet Wilfley table. The use of fresh water serves to eliminate soluble impurities, such as salt. The concentrate is then dried and passed over a low power magnet which removes magnetic minerals, such as chromite, ilmenite, magnetite and to a certain extent a portion of any monazite that may be present. The concentrate, consisting chiefly of a mixture of zircon and rutile grains, is then passed over a high power induction magnet, which separates about ½ to ⅔ of the zircon from the rutile, leaving a pure zircon fraction and a rutile fraction containing considerable zircon. The rutile fraction is then passed over an electrostatic separator, activated by a modified Wimshurst generator and controlled by gas discharge tubes. By means of successive passages over the electrostatic separator a rutile of the required degree of purity is easily obtained. This pure concentrate is then suitably comminuted by grinding in a porcelain lined ball mill (or in iron equipment followed by acid leach to remove iron introduced in milling), to particle sizes varying from 0.5 to 40 microns.

Rutile B

This material is prepared in the same general fashion as rutile A except that the grinding is carried to particle sizes varying from 0.5 to 8 microns.

For the purposes of comparison, a titanium dioxide body and a rutile body containing no titanates were prepared as follows: 1 kilogram of heavy grade titanium dioxide and 1 kilogram of rutile B, respectively, are separately thoroughly mixed with 10% by weight of 5% gelatin solution and passed through a 20 mesh screen. 125 grams of each batch is placed in the cavity of a steel mold of 4 inches in diameter and the specimens formed under pressure of 1200 pounds per square inch. The bodies are then fired according to the following schedule: the heavy grade titanium dioxide body is brought to a temperature of 2300° F. and the rutile body to a temperature of 2400° F., each at the rate of 50° F. per hour. They are held six hours at the peak temperature, the temperature then descreased at the rate of 50° per hour to 1200° F., then at the rate of 100° F. per hour from 1200° F. to 800° F., and the furnace then shut down. Close textured bodies about 0.5 cms. thick and 8.76 cms. in diameter are produced.

Having described the invention the following examples are now given:

EXAMPLE 1

900 grams of heavy grade titanium dioxide and 100 grams of barium titanate ($BaTiO_3$) are thoroughly mixed by ball milling with water, dried and disintegrated. To this mixture 10% by weight of 5% gelatin solution is added and thoroughly incorporated and the batch passed through a 20 mesh screen. 125 grams of the batch is placed in the cavity of a steel mold 4 inches in diameter and the specimen formed under a pressure of 1200 pounds per square inch. The body is then fired according to the following schedule: it is brought to a temperature of 1800° F. at the rate of 50° F. per hour and then at the rate of 100° F. per hour from 1800° F. to the peak temperature (2300° F.). The body is held at the peak temperature for six hours. The temperature is then decreased at the rate of 100° F. per hour to 1800° F. and the furnace then shut down. A close textured body about 0.5 cm. thick and 8.68 cms. in diameter is produced.

EXAMPLE 2

The same procedure is followed as in Example 1 except that rutile A is used in place of heavy grade titanium dioxide, and that the peak temperature employed is 2350° F.

EXAMPLE 3

900 grams of heavy grade titanium dioxide and 100 grams of strontium titanate ($SrTiO_3$) are thoroughly mixed by ball milling with water, dried and disintegrated. To this mixture 10% by weight of 5% gelatin solution is added and thoroughly incorporated and the batch passed through a 20 mesh screen. 125 grams of the batch is placed in the cavity of a steel mold 4 inches in diameter and the specimen formed under a pressure of 1200 pounds per square inch. The body is then fired according to the following schedule: it is brought to the peak temperature (2300° F.) at the rate of 50° F. per hour. It is held six hours at the peak temperature, the temperature then decreased at the rate of 50° F. per hour to 1200° F., then at the rate of 100° F. per hour from 1200° F. to 800° F., and the furnace then shut down. A close textured body about 0.5 cm. thick and 8.76 cms. in diameter is produced.

EXAMPLE 4

The same procedure is followed as in Example 3 except that rutile B is used in place of heavy grade titanium dioxide, and that the peak temperature employed is 2400° F.

EXAMPLE 5

The same procedure is followed as in Example 1 except that calcium titanate ($CaTiO_3$) is used in place of barium titanate.

EXAMPLE 6

The same procedure is followed as in Example 5 except that rutile A is used in place of heavy grade titanium dioxide and that the peak temperature employed is 2400° F.

EXAMPLE 7

The same procedure is followed as in Example 3 except that cadmium titanate ($CdTiO_3$) is used in place of strontium titanate.

EXAMPLE 8

The same procedure is followed as in Example 7 except that rutile B is used in place of heavy grade titanium dioxide and that the peak temperature employed is 2400° F.

EXAMPLE 9

The same procedure is followed as in Example 3 except that lead titanate ($PbTiO_3$) is used in place of strontium titanate.

EXAMPLE 10

The same procedure is followed as in Example 9 except that rutile B is used in place of heavy grade titanium dioxide and that the peak temperature employed is 2400° F.

EXAMPLE 11

The same procedure is followed as in Example 3 except that zinc titanate ($ZnTiO_3$) is used in place of strontium titanate.

EXAMPLE 12

The same procedure is followed as in Example 11 except that rutile B is used in place of heavy grade titanium dioxide and that the peak temperature employed is 2400° F.

EXAMPLE 13

The same procedure is followed as in Example 3 except that boron titanate ($B_2TiO_5$) is used in place of strontium titanate.

Electrical and shrinkage measurements were made on these bodies and exhibited the results shown in Table III (at 20°–25° C. and 50%–60% relative humidity). Resistivity (Resist.) was measured at intervals of one, two and three minutes after the current was initially applied and is given in megohm-centimeters. A current of 90 volts was used. The dielectric constant (K) and the power factor (PF) were measured at frequencies of 1,000,000 cycles per second with approximately 35% modulation at 20 volts input. In each case the weighted average for a number of test pieces is given, the number of pieces tested being from 3 to 6.

TABLE III

| Example No. | Resist. 1 min. | Resist. 2 min. | Resist. 3 min. | K | PF |
|---|---|---|---|---|---|
| | | | | | Percent |
| 1 | 9,920,000 | 11,100,000 | 12,070,000 | 88.9 | 0.02 |
| 2 | 6,550,000 | 8,200,000 | 10,000,000 | 75.4 | 0.04 |
| 3 | 19,400,000 | 26,000,000 | 29,200,000 | 106.7 | 0.11 |
| 4 | 7,580,000 | 9,856,250 | 11,392,000 | 84.1 | 0.075 |
| 5 | 2,910,000 | 4,010,000 | 5,090,000 | 104.4 | 0.43 |
| 6 | 370,000 | 382,000 | 426,000 | 95.7 | 0.04 |
| 7 | 10,500,000 | 12,400,000 | 13,100,000 | 72.2 | 0.17 |
| 8 | 6,178,500 | 7,686,000 | 8,483,000 | 75.4 | 0.06 |
| 9 | 9,700,000 | 10,900,000 | 11,900,000 | 83.0 | 0.15 |
| 10 | 8,695,700 | 10,924,300 | 14,378,600 | 78.6 | 0.06 |
| 11 | 10,500,000 | 13,100,000 | 14,000,000 | 67.2 | 0.12 |
| 12 | 360,750 | 361,570 | 367.625 | 73.5 | 0.07 |
| 13 | 12,400,000 | 19,900,000 | 28,400,000 | 74.0 | 0.11 |

The dielectric strength was not measured, but in all cases was excellent and well within the commercially practical range.

The change in power factor and dielectric constant with increase in temperature is shown in Tables IV and V. Measurements in this case were made only on the best sample test piece in each series. Although the measurements were made up to 150° C., temperatures above 75° C. are not usually encountered in practice, especially in radio and television work. Therefore the figures above 75° C. are relatively unimportant.

TABLE IV

*Power factor (percent)*

| Temperature | Example number | | | | | | |
|---|---|---|---|---|---|---|---|
| | 1 | 2 | 3 | 4 | 5 | 6 | 7 |
| 18° C | | | | | | | 0.06 |
| 20° C | 0.00+ | 0.025 | 0.02 | 0.01 | 0.13 | 0.05 | |
| 40° C | 0.02 | 0.05 | 0.05 | 0.04 | 0.17 | 0.08 | 0.11 |
| 50° C | 0.03 | 0.05 | 0.05 | 0.04 | 0.18 | 0.09 | 0.12 |
| 75° C | 0.03 | 0.07 | 0.05 | 0.04 | 0.19 | 0.10 | 0.13 |
| 100° C | 0.03 | 0.09 | 0.06 | 0.05 | 0.20 | 0.11 | 0.15 |
| 110° C | 0.03 | 0.10 | 0.07 | 0.05 | 0.21 | 0.12 | 0.18 |
| 125° C | 0.03 | 0.11 | 0.10 | 0.055 | 0.25 | 0.13 | 0.20 |
| 135° C | 0.04 | 0.12 | 0.12 | 0.07 | 0.30 | 0.14 | 0.25 |
| 150° C | 0.03 | 0.13 | 0.15 | 0.08 | 0.39 | 0.16 | 0.26 |

| Temperature | Example number | | | | | |
|---|---|---|---|---|---|---|
| | 8 | 9 | 10 | 11 | 12 | 13 |
| 17° C | | | | | 0.05 | |
| 19° C | | 0.08 | | | | |
| 20° C | | | 0.00 | | | |
| 25° C | 0.02 | | | 0.07 | | 0.03 |
| 40° C | 0.06 | 0.20 | 0.03 | 0.13 | 0.10 | 0.09 |
| 50° C | 0.07 | 0.22 | 0.03 | 0.13 | 0.13 | 0.09 |
| 75° C | 0.07 | 0.30 | 0.03 | 0.13 | 0.15 | 0.09 |
| 100° C | 0.09 | 0.46 | 0.03 | 0.13 | 0.21 | 0.09 |
| 110° C | 0.11 | 0.52 | 0.04 | 0.13 | 0.23 | 0.10 |
| 125° C | 0.11 | 0.58 | 0.04 | 0.11 | 0.26 | 0.10 |
| 135° C | 0.11 | 0.50 | 0.03 | 0.13 | 0.27 | 0.10 |
| 150° C | 0.10 | 0.50 | 0.03 | 0.13 | 0.30 | 0.11 |

TABLE V

*Dielectric constant*

| Temperature | Example number | | | | | | |
|---|---|---|---|---|---|---|---|
| | 1 | 2 | 3 | 4 | 5 | 6 | 7 |
| 18° C | | | | | | | 78.2 |
| 20° C | 90.6 | 93.8 | 111.5 | 89.5 | 106.9 | 97.4 | |
| 40° C | 88.5 | 92.1 | 109.8 | 87.5 | 105.7 | 96.4 | 76.6 |
| 50° C | 88.3 | 91.4 | 109.3 | 87.0 | 105.3 | 95.6 | 75.8 |
| 75° C | 86.7 | 89.5 | 106.8 | 85.2 | 103.0 | 93.4 | 75.3 |
| 100° C | 85.8 | 83.3 | 105.0 | 84.0 | 101.5 | 92.2 | 71.6 |
| 110° C | 85.0 | 87.7 | 103.6 | 82.9 | 100.8 | 91.3 | 70.0 |
| 125° C | 83.9 | 86.4 | 101.7 | 82.0 | 98.8 | 90.3 | 68.1 |
| 135° C | 83.4 | 85.9 | 100.6 | 81.2 | 98.2 | 89.5 | 66.4 |
| 150° C | 82.9 | 85.0 | 99.3 | 80.5 | 97.3 | 88.5 | 63.2 |

| Temperature | Example number | | | | | |
|---|---|---|---|---|---|---|
| | 8 | 9 | 10 | 11 | 12 | 13 |
| 17° C | | | | | 78.3 | |
| 19° C | | 86.7 | | | | |
| 20° C | | | | 76.4 | | |
| 25° C | 76.5 | | | | 77.2 | 78.2 |
| 40° C | 74.6 | 84.8 | 74.8 | 75.4 | 75.3 | 76.3 |
| 50° C | 73.9 | 83.2 | 74.4 | 75.1 | 72.4 | 75.6 |
| 75° C | 72.5 | 81.9 | 72.5 | 72.2 | 66.8 | 72.7 |
| 100° C | 71.8 | 78.7 | 71.7 | 70.8 | 64.5 | 71.1 |
| 110° C | 71.0 | 77.6 | 71.4 | 69.4 | 63.5 | 70.2 |
| 125° C | 69.4 | 76.5 | 70.6 | 67.0 | 62.2 | 69.1 |
| 135° C | 68.0 | 74.8 | 70.0 | 65.9 | 61.4 | 68.4 |
| 150° C | 64.4 | 72.3 | 68.3 | 64.3 | 60.2 | 67.4 |

It will be seen from the above tables that the dielectric characteristics of the ceramic materials in accordance with this invention are excellent. In most cases, in addition, these extremely satisfactory dielectric characteristics are changed very slightly with temperature. With some the change over a wide range is nil (i. e. the curve is flat), which is a very desirable quality in radio and television work. It will be noted that the ratio of the one minute resistivities of the titanium dioxide body containing no titanate to the one minute resistivity of the rutile body containing no titanate is about 30—1. In the case of most of the titanates added in accordance with the present invention, this ratio is very much reduced. In the case of lead (Examples 9 and 10), the ratio is practically 1—1. In the case of cadmium (Examples 7 and 8), the ratio is less than 2—1. In the case of barium (Examples 1 and 2), the ratio is approximately 1½—1. In the case of strontium (Examples 3 and 4), the ratio is less than 3—1. In the case of calcium (Examples 5 and 6), the ratio is about 8—1. The value of lead titanate in eliminating the effect of vanadium as an impurity is particularly noticeable. The titanates of the present invention may be used either singly or in combination. For example, by employing a mixture of lead titanate and strontium titanate, or lead titanate and barium titanate, or lead titanate and cadmium titanate; the characteristic of lead titanate in eliminating the effect of impurities may be combined with the desirable electrical characteristics imparted by the other three titanates.

For purposes of comparison, the characteristics of the heavy grade titanium dioxide body and the rutile body containing no titanates, prepared as described above, are given in Tables VI and VII following

TABLE VI

| | | H. G. $TiO_2$ | Rutile |
|---|---|---|---|
| Resist. 1 min | | 3,648,400 | 120,120 |
| Resist. 2 min | | 4,900,000 | 128,250 |
| Resist. 3 min | | 6,080,700 | 132,850 |
| K | | 104.9 | 90.0 |
| PF | per cent | 0.07 | 0.10 |

TABLE VII

| Temperature | H. G. $TiO_2$ | | Rutile | |
|---|---|---|---|---|
| | K | PF | K | PF |
| | | Per cent | | Per cent |
| 20° C | 106.8 | 0.06 | 92.9 | 0.05 |
| 40° C | 105.5 | 0.07 | 90.9 | 0.05 |
| 50° C | 105.2 | 0.07 | 90.4 | 0.07 |
| 75° C | 103.9 | 0.07 | 89.3 | 0.10 |
| 100° C | 101.8 | 0.07 | 87.6 | 0.13 |
| 110° C | 100.5 | 0.07 | 86.7 | 0.14 |
| 125° C | 98.9 | 0.08 | 85.2 | 0.18 |
| 135° C | 98.4 | 0.09 | 84.5 | 0.20 |
| 150° C | 97.5 | 0.10 | 83.7 | 0.22 |

In this case of bodies containing boron titanate, an extremely valuable property is the enormous strength developed on firing. This property is of prime importance in the fabrication of insulators to be used as ground foundations for cross country high tension installations where the insulator must have great strength to resist the weight of the steel column, must have high resistivity, high capacitance and good temperature perquisites. In all respects the $B_2TiO_5$ fulfills the necessary qualifications.

As many variations are possible within the scope of this invention, it is not intended to be limited except as defined by the appended claims. The term "alkaline earth" as used in the present specification and claims is understood to include the elements calcium, barium and strontium only.

We claim:

1. The method of forming a ceramic dielectric material comprising firing at an elevated temperature a composition containing 80 to 97% of titanium dioxide and 3 to 20% of a preformed material taken from the class consisting of calcium titanate, strontium titanate, barium titanate, cadmium titanate, zinc titanate, and divalent lead titanate.

2. The method of forming a ceramic dielectric material comprising firing, at an elevated temperature such as to obtain maximum vitreous structure with substantially no crystalline growth, a composition containing 80 to 97% of titanium dioxide and 3 to 20% of a preformed material taken from the class consisting of calcium titanate, strontium titanate, barium titanate, cadmium titanate, zinc titanate, and divalent lead titanate.

3. The method of forming a ceramic dielectric material comprising firing at an elevated temperature a composition containing 80 to 97% of titanium dioxide and 3 to 20% of strontium titanate.

4. The method of forming a ceramic dielectric material comprising firing, at an elevated temperature such as to obtain maximum vitreous structure with substantially no crystalline growth, a composition containing 80 to 97% of titanium dioxide and 3 to 20% of strontium titanate.

5. The method of forming a ceramic dielectric material comprising firing at an elevated temperature a composition containing 80 to 97% of titanium dioxide and 3 to 20% of barium titanate.

6. The method of forming a ceramic dielectric material comprising firing, at an elevated temperature such as to obtain maximum vitreous structure with substantially no crystalline growth, a composition containing 80 to 97% of titanium dioxide and 3 to 20% of barium titanate.

7. The method of forming a ceramic dielectric material comprising firing at an elevated temperature a composition containing 80 to 97% of titanium dioxide and 3 to 20% of divalent lead titanate.

8. The method of forming a ceramic dielectric material comprising firing, at an elevated temperature such as to obtain maximum vitreous structure with substantially no crystalline growth, a composition containing 80 to 97% of titanium dioxide and 3 to 20% of divalent lead titanate.

EUGENE WAINER.
NORMAN R. THIELKE.